(12) United States Patent
Uenaga (10) Patent No.: US 12,422,546 B2
(45) Date of Patent: Sep. 23, 2025

(54) LAMP DEVICE

(71) Applicant: Stanley Electric Co., Ltd., Tokyo (JP)

(72) Inventor: Yuta Uenaga, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 345 days.

(21) Appl. No.: 18/020,947

(22) PCT Filed: Sep. 21, 2021

(86) PCT No.: PCT/JP2021/034550
§ 371 (c)(1),
(2) Date: Feb. 13, 2023

(87) PCT Pub. No.: WO2022/065293
PCT Pub. Date: Mar. 31, 2022

(65) Prior Publication Data
US 2023/0296762 A1    Sep. 21, 2023

(30) Foreign Application Priority Data

Sep. 24, 2020 (JP) .................................. 2020-159859

(51) Int. Cl.
*G01S 13/931* (2020.01)
*G01S 7/02* (2006.01)
(Continued)

(52) U.S. Cl.
CPC ............ *G01S 13/931* (2013.01); *G01S 7/027* (2021.05); *G01S 7/40* (2013.01); *H01Q 1/3233* (2013.01); *G01S 2013/93277* (2020.01)

(58) Field of Classification Search
CPC .......... G01S 13/931; G01S 7/027; G01S 7/40; G01S 2013/93277; H01Q 1/3233
(Continued)

(56) References Cited

U.S. PATENT DOCUMENTS 5,923,282 A * 7/1999 Honma ................. G01S 7/2927
                                                     342/135
6,081,223 A * 6/2000 Kitahara ............... G01S 13/931
                                                      342/72
(Continued)

FOREIGN PATENT DOCUMENTS

CN          205484774 U      8/2016
CN          109690349 A  *   4/2019    ........... G01S 13/931
(Continued)

OTHER PUBLICATIONS

Supplementary European Search Report mailed Dec. 8, 2023, in European Application No. 21872422.7, 17 pages.
(Continued)

*Primary Examiner* — Nuzhat Pervin
(74) *Attorney, Agent, or Firm* — XSENSUS LLP (57) ABSTRACT

Provided is a lamp device including: a housing, which is a part to be attached to a vehicle; a lamp unit; a radar unit having an antenna which transmits a radar wave and receives a reflection wave from an object; a light-transmissive cover which is attached to cover a front surface of the housing so as to accommodate therein the lamp unit and the radar unit, and through which the radar wave passes; and a radio wave absorption section provided on a surface of the housing that faces the light-transmissive cover or on a surface on the opposite side therefrom.

14 Claims, 11 Drawing Sheets

(51) Int. Cl.
*G01S 7/40* (2006.01)
*H01Q 1/32* (2006.01)

(58) Field of Classification Search
USPC .......................................................... 342/455
See application file for complete search history.

(56) References Cited

U.S. PATENT DOCUMENTS

| | | | | |
|---|---|---|---|---|
| 6,414,628 B1* | 7/2002 | Ashihara | ............... | G01S 7/4056 |
| | | | | 342/115 |
| 8,604,968 B2* | 12/2013 | Alland | ................ | G01S 13/867 |
| | | | | 342/22 |
| 9,610,912 B2* | 4/2017 | Schaaf | ................. | B60R 19/483 |
| 10,372,138 B2* | 8/2019 | Gilliland | ............... | G01S 17/931 |
| 11,509,042 B2* | 11/2022 | Stav | ..................... | H01Q 21/065 |
| 2007/0046408 A1* | 3/2007 | Shim | ..................... | H01F 27/366 |
| | | | | 335/296 |
| 2008/0252293 A1* | 10/2008 | Lagae | ................... | H04B 1/7163 |
| | | | | 324/318 |
| 2012/0146839 A1* | 6/2012 | Hidume | ............... | G01S 13/345 |
| | | | | 342/146 |
| 2014/0375490 A1* | 12/2014 | Pfitzenmaier | ....... | H01Q 1/3233 |
| | | | | 342/4 |
| 2015/0123872 A1* | 5/2015 | Fujita | ...................... | G01S 7/03 |
| | | | | 343/872 |
| 2017/0336496 A1* | 11/2017 | Fujii | ....................... | G01S 13/04 |
| 2019/0056477 A1* | 2/2019 | Jonas | .................... | G01S 13/931 |
| 2019/0275923 A1* | 9/2019 | Fushimi | .................. | G01S 17/87 |
| 2019/0377061 A1* | 12/2019 | Kobayashi | ........... | H01Q 1/3233 |
| 2020/0101889 A1* | 4/2020 | Iwai | ...................... | G01S 13/931 |
| 2020/0174100 A1* | 6/2020 | Hori | ..................... | B60Q 1/0023 |
| 2020/0339032 A1* | 10/2020 | Iwai | ......................... | F21S 41/30 |
| 2021/0181298 A1* | 6/2021 | Hong | ...................... | G01S 7/032 |
| 2021/0184343 A1* | 6/2021 | Lee | ............................ | H01Q 1/405 |
| 2021/0197707 A1* | 7/2021 | Iwai | ..................... | H01Q 1/3233 |

FOREIGN PATENT DOCUMENTS

| | | | | |
|---|---|---|---|---|
| DE | 102016119275 A1 | 4/2018 | | |
| DE | 102017122578 A1 | 3/2019 | | |
| EP | 3107151 A1 * | 12/2016 | .......... | H01Q 1/3233 |
| EP | 3514576 A1 | 7/2019 | | |
| JP | H10-142330 A | 5/1998 | | |
| JP | 2004-101450 A | 4/2004 | | |
| JP | 2010-286245 A | 12/2010 | | |
| JP | 1842161 B2 | 12/2011 | | |
| JP | 5130192 B2 | 1/2013 | | |
| JP | 2020-51974 A | 4/2020 | | |
| WO | 2018/052087 A1 | 3/2018 | | |
| WO | 2020/189685 A1 | 9/2020 | | |

OTHER PUBLICATIONS

Extended European search report issued on Apr. 9, 2024, in corresponding European patent Application No. 21872422.7, 20 pages.
Office Action issued on Aug. 20, 2024, in corresponding Japanese patent Application No. 2020-159859, 8 pages.
International Search Report and Written Opinion mailed on Nov. 2, 2021, received for PCT Application PCT/JP2021/034550, filed on Sep. 21, 2021, 11 pages including English Translation.

* cited by examiner

LAMP DEVICE

CROSS-REFERENCE TO RELATED APPLICATIONS

The present application is based on PCT filing PCT/JP2021/034550, filed Sep. 21, 2021, which claims priority to JP 2020-159859, filed Sep. 24, 2020, the entire contents of each are incorporated herein by reference.

TECHNICAL FIELD

The present invention relates to a lamp device, and more particularly, to a vehicle lamp device incorporating a radar device.

BACKGROUND ART

Various sensors such as cameras, LiDAR (Light Detection and Ranging), and millimeter wave sensors, are used in addition to acceleration sensors and GPS sensors for driver assistance and autonomous driving.

In particular, millimeter wave radars are not affected by environments such as nighttime and backlight, and adverse weather such as dense fog, rainfall, and snowfall, thus maintaining high environmental resistance performance. In addition, the distance and direction to an object and the relative speed to the object can be directly detected. Therefore, millimeter wave radars are characterized by being capable of detecting an object even at a short distance at high speed and with high accuracy.

Patent Literature 1 discloses a vehicle lamp fitting in which a millimeter wave radar is mounted in a lamp chamber, and a light guide member that transmits millimeter waves is provided between a front cover and the millimeter wave radar.

Patent Literature 2 discloses a vehicle lamp fitting provided with a resin cover which includes a light source unit and a millimeter wave radar therein and which is visible on the exterior of a vehicle body, and an opaque design portion is provided on a part of the resin cover so as to shield the millimeter wave radar by the design portion.

Further, Patent Literature 3 discloses an in-vehicle light device provided with a separator which is disposed to partition a space between a lamp unit and a radar unit and which shields the transmission of radiant heat and electromagnetic waves between the lamp unit and the radar unit.

CITATION LIST

Patent Literature

Patent Literature 1: Japanese Patent No. 4842161
Patent Literature 2: Japanese Patent No. 5130192
Patent Literature 3: Japanese Unexamined Patent Application Publication No. 2020-51974

SUMMARY OF INVENTION

Technical Problem

However, if radar waves are reflected by a member disposed in front of a radar unit, such as a front cover or an extension, and ghost (an obstacle that does not actually exist) occurs due to the reflection wave and multiple-reflection waves, then the detection function of the radar device will be degraded.

The present invention has been made in view of the above-described circumstances, and an object of the invention is to provide a lamp device which can effectively suppress the reflection and multiple reflection of radar waves, and has high-precision radar functions such as low noise and wide dynamic range.

Another object of the present invention is to provide a lamp device that can effectively suppress the multiple reflection caused by reflection radar waves reflected by a part constituting a vehicle body and returned into a lamp body, and has high-precision radar functions.

Solution to Problem

A lamp device according to an embodiment of the present invention has:
a housing, which is a part to be attached to a vehicle;
a lamp unit;
a radar unit having an antenna which transmits a radar wave and receives a reflection wave from an object;
a light-transmissive cover which is attached to cover a front surface of the housing in such a manner as to accommodate therein the lamp unit and the radar unit, and through which the radar wave passes; and
a radio wave absorption section provided on a surface of the housing that faces the light-transmissive cover or on a surface on the opposite side therefrom.

A lamp device according to another embodiment of the present invention includes:
a housing, which is a part to be attached to a vehicle;
a lamp unit;
a radar unit having an antenna which transmits a radar wave and receives a reflection wave from an object; and
a light-transmissive cover which is attached to cover a front surface of the housing in such a manner as to accommodate therein the lamp unit and the radar unit, and through which the radar wave passes;
wherein the housing includes a radio wave absorption material which absorbs the radar wave.

DESCRIPTION OF EMBODIMENTS

The following will describe preferred embodiments of the present invention, but these embodiments may be modified or combined as appropriate and then applied. Further, in the following description and the accompanying drawings, substantially the same or equivalent parts will be described with the same reference numerals.

First Embodiment

Figure 1:
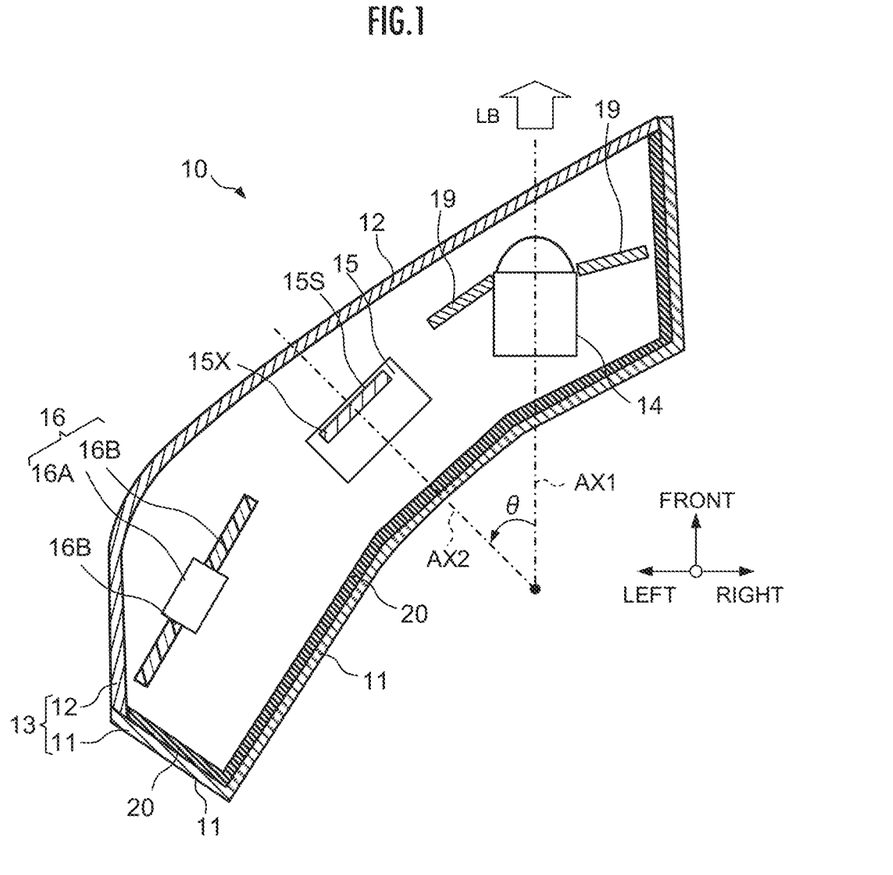
FIG. 1 is a diagram schematically illustrating an example of the internal structure of a lamp device according to an embodiment of the present invention.

FIG. 1 is a diagram schematically illustrating an example of the internal structure of a lamp device 10 according to a first embodiment of the present invention. The lamp device 10 is mounted on a vehicle such as an automobile. The lamp device 10 is used as, for example, a headlight, but can be also used as a lamp device of a taillight or the like.

In the following, a description will be given of an automobile as an example of a vehicle, but the present invention is not limited thereto. More specifically, in the present specification, the vehicle means a vehicle such as a ship, an aircraft, as well as manned and unmanned transportation means.

FIG. 1 schematically illustrates a section in a horizontal plane (or a plane parallel to a road surface) of the lamp device 10 mounted on the front left of the vehicle (left headlight) viewed from above.

In the lamp device 10, a base body (housing) 11 and a light-transmissive cover (front cover) 12 mounted on the front surface of the base body 11 or in front thereof constitute a lamp enclosure (casing) 13.

More specifically, the light-transmissive cover 12 is installed to the base body 11 in such a manner as to cover the front surface of the base body 11, and the base body 11 is installed to the vehicle body thereby to mount the lamp device 10 on the vehicle body (not illustrated). Further, the light-transmissive cover 12 includes a light-transmissive cover that transmits light other than white, such as red and yellow.

The base body 11 is formed of plastic (resin). For example, PP (polypropylene) is used for a headlight, and ASA (acrylonitrile-styrene-acrylic rubber) is used for a taillight, but the plastic (resin) used is not limited thereto. Further, metal or the like may be partly used.

Further, the light-transmissive cover 12 is formed of a light-transmissive resin such as polycarbonate (PC) or acrylic (PMMA).

The lamp enclosure 13 includes therein a headlight unit 14, which is a lamp unit (light source unit), a millimeter wave radar unit, which is a radar unit (hereinafter referred to simply as the radar unit) 15, a light emitting unit 16, and extensions 19. The base body 11 is placed on the rear side as observed from a surface excluding a transmitting/receiving surface (an antenna surface 15S to be discussed later) of the radar unit 15, i.e., as observed from, for example, the radar unit 15.

In the present embodiment, a radio wave absorber 20 is provided on the base body 11 as a radio wave absorption section, which absorbs radar waves. More specifically, the radio wave absorber 20 is placed at a position where the radio wave absorber 20 absorbs the reflection radar waves which are reflected by a member, especially the light-transmissive cover 12, placed in front of the radar unit in the lamp device 10, and which are directed toward a vehicle component, and the reflection radar waves which are reflected by the vehicle component and directed into the lamp device 10. This means that the reflection radar waves are absorbed by the radio wave absorber 20 in a round trip. In FIG. 1, the radio wave absorber 20 is placed on the inner side of the base body 11, that is, on the side facing the light-transmissive cover 12, but may alternatively be provided on the outer side thereof, i.e., on the side opposite from the light-transmissive cover 12.

The vehicle components are components that reflect radar waves, which are metal vehicle components such as an engine, a chassis, and a radiator, in particular.

In the present specification, the lamp device 10 is not limited to a headlight light source, but refers to a light emitting device having a purpose or a function of emitting light toward the outside, such as a taillight or a backup light.

The headlight unit 14 has a light source such as an LED (Light Emitting Diode), and a lens or a reflector for distributing and irradiating the light from the light source. The headlight unit 14 is placed along an optical axis AX1 and is provided such that irradiation light LB of a low beam (passing beam) and a high beam (driving beam) is irradiated in a forward (FRONT in the drawing) direction.

The radar unit 15 has, on the front surface thereof, a transmitting/receiving surface 15S on which a millimeter wave transmitting/receiving antenna 15X is provided. In the present specification, the transmitting/receiving surface (the front surface of the radar unit 15) of the radar unit (radar device) 15 is referred to also as the antenna surface 15S.

The radar unit 15 transmits millimeter waves from the transmitting/receiving antenna 15X and receives reflection waves reflected by an object.

The received signals are subjected to signal processing by a control unit, such as a signal processor, to detect the distance, the speed, and the angle with respect to the object. In the case of the radar unit 15, millimeter waves in, for example, a 76 to 81 GHz band, particularly millimeter waves in a 79 GHz band are suitably used, but the millimeter waves are not limited to these frequency bands.

The light emitting unit 16 has a light source 16A and a light guide 16B composed of at least one light guide member that guides light from the light source 16A. The light emitting unit 16 functions as a DRL (Daytime Running Lights) or a turn lamp. The light source 16A has, for example, an LED, an incandescent light bulb, or the like, and supplies the light thereof to the light guide 16B.

A normal direction AX2 of the antenna surface 15S of the radar unit 15 is set to an angle θ (45° in the present embodiment) outward (i.e., leftward in the case of a left headlight) with respect to the optical axis AX1 of the headlight unit 14 (or with respect to the traveling direction of the vehicle).

Further, the extensions 19 are provided in the lamp enclosure 13. The extensions 19 are design components provided to reflect light or guide light, or make internal structures or the like less visible from the outside.

The light emitting unit 16 and the extensions 19 may not necessarily be provided.

In the present embodiment, the radar waves from the radar unit 15 (the transmission wave TX) are directly irradiated to the outside through the light-transmissive cover 12.

A shielding member for making the radar unit 15 less visible from the outside may be provided in front of the radar unit 15.

Figure 2A:
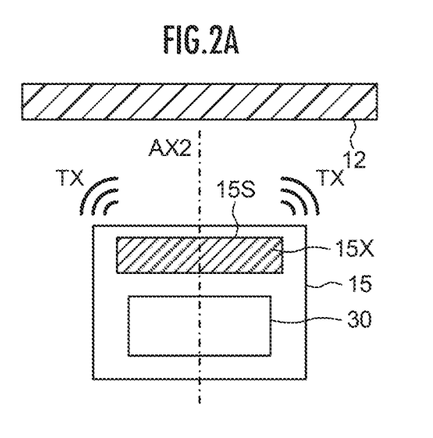
FIG. 2A is a diagram schematically illustrating the configuration and the placement of a radar unit 15.

FIG. 2A is a diagram schematically illustrating the configuration and placement of the radar unit 15. The radar unit 15 has a transmitting antenna (TX antenna) 15TX, a receiving antenna (RX antenna) 15RX, and a millimeter wave sensor device (hereinafter may be referred to also as the millimeter wave sensor module) 30. The transmitting antenna 15TX and the receiving antenna 15RX can be configured as a common antenna 15X, depending on the radar system. Hereinafter, when the transmitting antenna and the receiving antenna are not particularly distinguished, these antennas will be described as the transmitting/receiving antenna 15X.

Figure 2B:
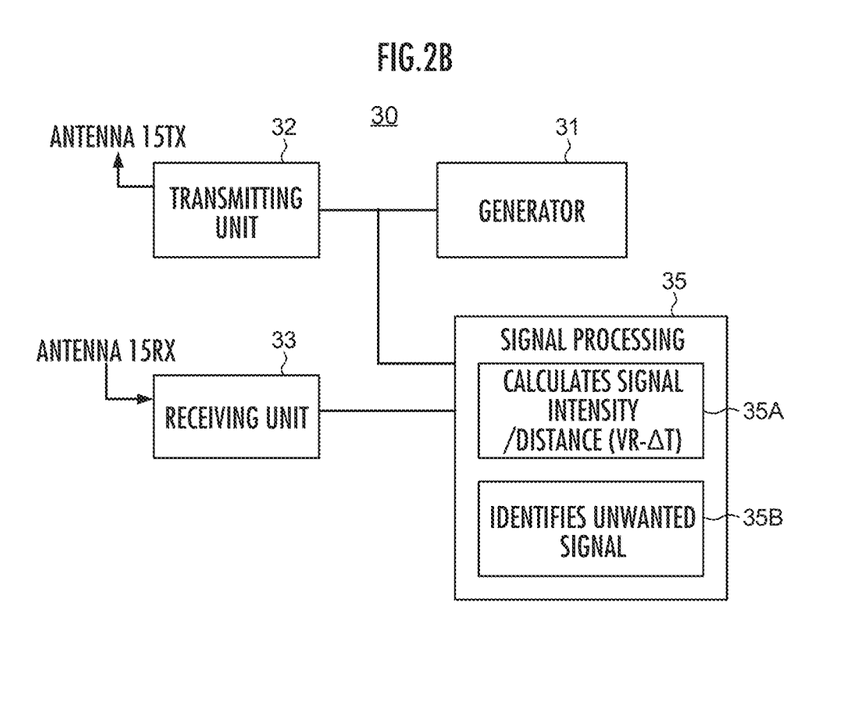
FIG. 2B is a block diagram illustrating an example of the configuration of a millimeter wave sensor module 30 provided in the radar unit 15.

FIG. 2B is a block diagram illustrating an example of the configuration of the millimeter wave sensor module 30 provided in the radar unit 15.

The millimeter wave sensor module 30 detects a substance (object) by, for example, a pulse radar method or an FMCW (frequency-modulated continuous wave) method. More specifically, a generator (synthesizer type) 31 generates transmission waves. A repetitive pulse wave is generated as a transmission wave in the case of the pulse radar method, or a modulated wave is generated as a transmission wave in the case of the FMCW method.

The transmission wave (TX wave) generated by the generator 31 is transmitted as the transmission wave from the transmitting antenna 15TX by a transmitting unit 32.

The reflection wave (RX wave) reflected by the substance is received by the receiving antenna 15RX. The transmission wave and the received reflection wave (received wave) are subjected to signal processing by a signal processor 35 so as to detect the distance, the speed, and the angle with respect to the substance.

The signal processor 35 has an object distance/intensity calculating unit 35A, which calculates a signal intensity (the received signal intensity) VR of the received wave and the distance (or a time lag $\Delta t$) of the substance, which is the object to be detected, and a signal identification unit 35B which identifies the signal from the substance on the basis of the calculated signal intensity and distance.

The signal identification unit 35B has a relational expression indicating the correspondence relationship between the signal intensity VR and the distance (the time difference $\Delta t$) of the object, which is the substance to be properly detected.

The signal identification unit 35B distinguishes between the signal from the object to be detected and ghost or noise attributable to reflection (unwanted reflection wave) on the basis of the correspondence relationship and the wave absorption rate of the radio wave absorber 20 or a signal intensity attenuation rate. In other words, the signal identification unit 35B functions as a unit for identifying unwanted signals.

More specifically, for example, the signal identification unit 35B has an unwanted reflection distance/intensity calculation section that calculates the relationship between the time lag (time difference) of an unwanted reflection wave, which is attenuated by the radio wave absorber 20 before reaching the antenna 15X, from the point of transmission of a radar wave and the signal intensity of the unwanted reflection wave.

In the case of the FMCW method, a mixer, an AD converter (analog-to-digital converter: ADC), or the like is provided to mix a transmitted (modulated) wave and a received wave so as to generate an IF (intermediate frequency) signal.

The millimeter wave sensor device 30 is configured to be capable of detecting the distance (or the time lag) of a substance and the signal intensity of a radar wave to identify whether the signal is from the substance (the object).

Figure 3:
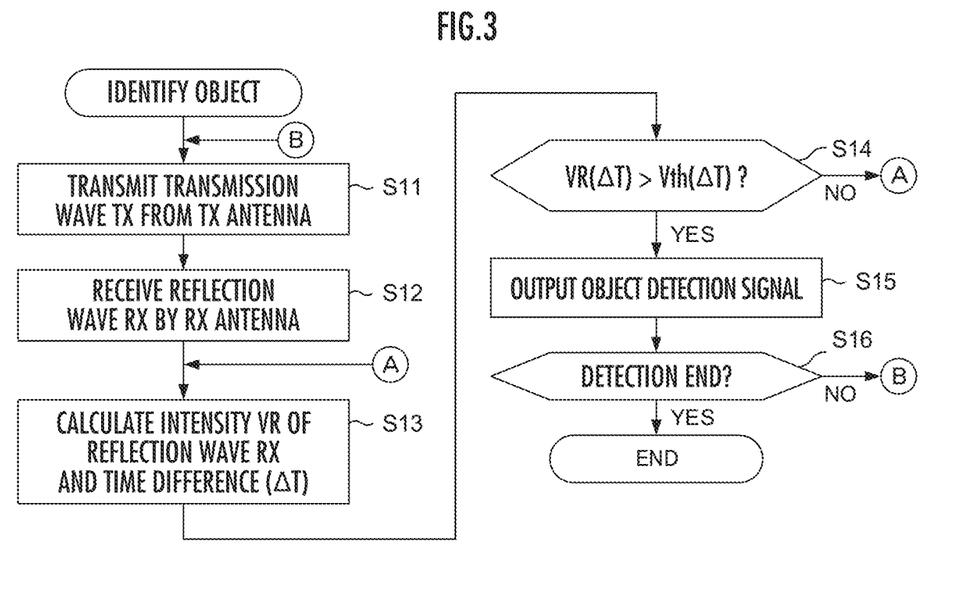
FIG. 3 is a flowchart illustrating an object identification procedure performed by the millimeter wave sensor module 30.
Figure 4:
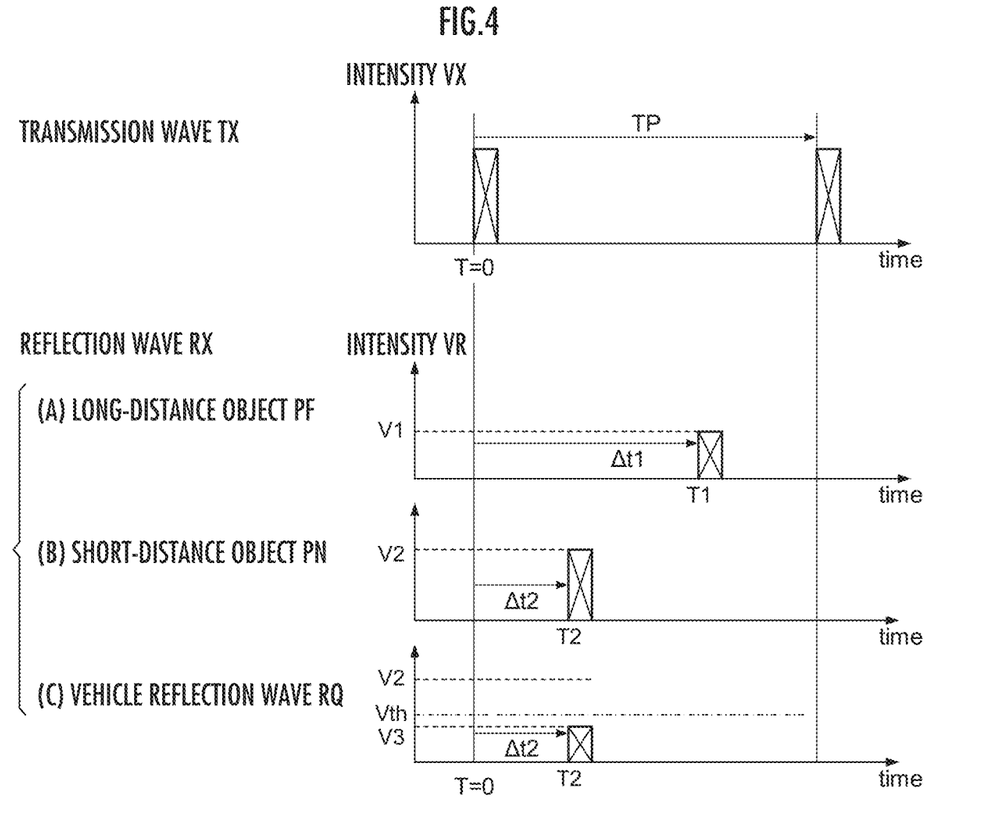
FIG. 4 is a time chart illustrating the relationship in time difference ($\Delta t$) between a transmission wave TX and a reflection wave RX in a pulse radar method.

FIG. 3 is a flowchart illustrating the procedure for identifying an object performed by the millimeter wave sensor module 30. FIG. 4 is a time chart illustrating the relationship in time difference ($\Delta t$) between the transmission wave TX and the reflection wave RX in a pulse radar method.

Figure 5:
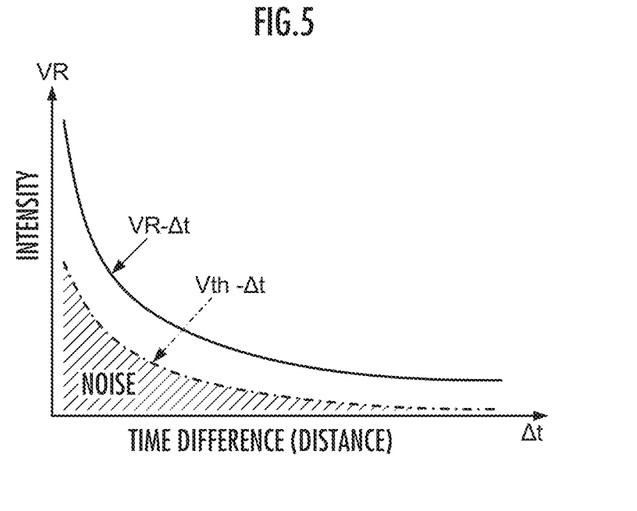
FIG. 5 is a graph illustrating the principle of identifying an object by the millimeter wave sensor module 30.
Figure 6:
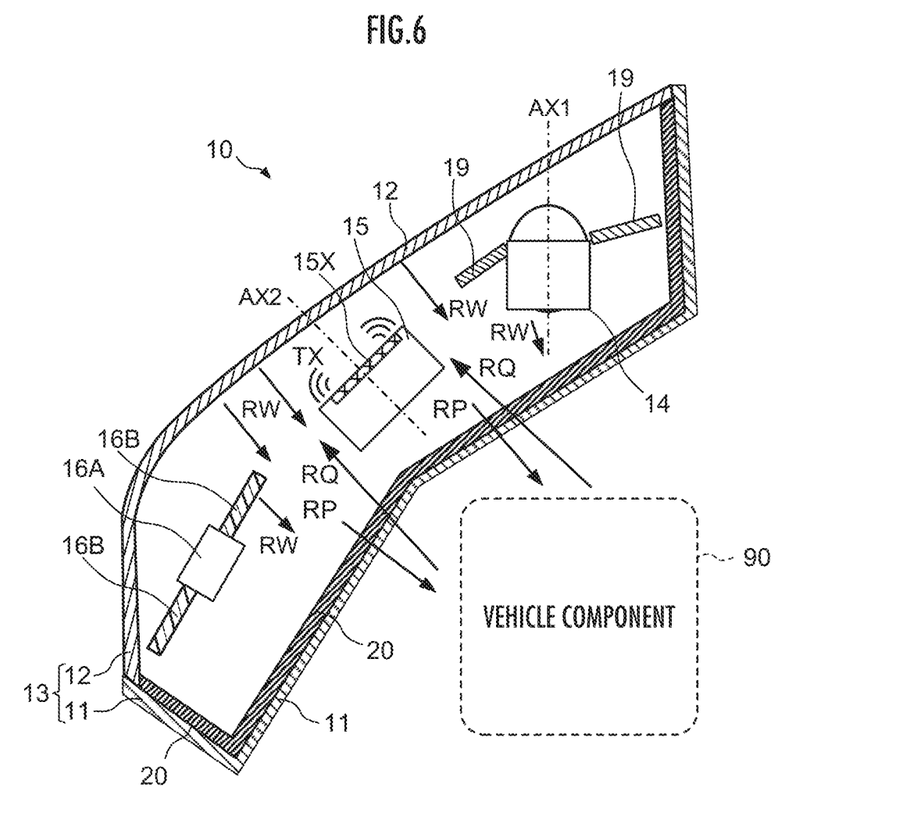
FIG. 6 is a diagram illustrating the reflection from a vehicle body component in a lamp device 10 of a first embodiment.

Further, FIG. 5 is a graph illustrating the principle of identifying an object by the millimeter wave sensor module 30. FIG. 6 is a diagram illustrating the reflection from a vehicle body component in the lamp device 10 of the present embodiment.

Referring to FIG. 3, the flow of identifying an object will be described. First, the millimeter wave sensor module 30 transmits the transmission wave TX generated by the generator 31 from the antenna 15TX (step S11). Then, the reflection wave RX reflected by a substance is received by the receiving antenna 15RX (step S12).

Subsequently, the signal processor 35 calculates the intensity VR of the reflection wave RX and the time difference ($\Delta t$) between the transmission wave TX and the reflection wave RX (step S13). The time difference ($\Delta t$) is equivalent to the distance to the substance that has reflected the transmission wave TX.

Referring now to FIG. 4, the reflection wave RX reflected by the substance is received, delaying by the time difference ($\Delta t$) from the moment of transmission (time T=0) of the transmission wave TX (an intensity VX).

For example, the time difference ($\Delta t1$) of the reflection wave RX from a substance (detection object PF) at a relatively long distance from the radar unit 15 is greater than a time difference ($\Delta t2$) of the reflection wave RX from a substance (detection object PN) at a relatively short distance ($\Delta t1 > \Delta t2$).

Further, regarding the signal intensity VR of the reflection wave RX, a signal intensity (V1) of the reflection wave RX from the substance (detection object PF) at a relatively long distance is smaller than a signal intensity (V2) of the reflection wave RX from the substance (detection object PN) at a relatively short distance (V1<V2).

Meanwhile, as illustrated in FIG. 6, inside the lamp device 10, there are reflection radar waves (hereafter referred to simply as the reflection waves) RW reflected or multiple-reflected by components in the device, such as the light-transmissive cover 12, which is the front cover, the headlight unit 14, and the extensions 19.

According to the lamp device 10 of the present embodiment, out of the reflection wave RW, a reflection wave RP directed toward a vehicle component 90 from the inside of the lamp device 10 and a vehicle reflection wave RQ reflected by the vehicle component 90 and directed into the lamp device 10 are absorbed by the radio wave absorber 20, and the intensities thereof are significantly decreased.

Consequently, the signal intensity of the reflection wave from the vehicle component 90 (reflection wave inside the vehicle) is, despite the short distance (smaller $\Delta t$), smaller than that of the reflection wave from the object to be detected (the short distance object PN) outside the lamp device 10 by the equivalent absorbed by the radio wave absorber 20. For example, as illustrated in FIG. 4, the signal intensity is smaller than the signal intensity of the short distance object PN even when the time difference (Δt2) is the same as the short distance object PN (V3<V2).

Referring again to FIG. 3 and FIG. 5, the signal processor 35 has a reference function (VR–Δt function) indicating the correspondence relationship between the signal intensity VR and the distance (time difference Δt) of an object which is to be properly detected. Based on the correspondence relationship and the rate of signal intensity attenuation by the radio wave absorber 20, the signal identification unit 35B distinguishes between the object to be detected and the ghost or noise attributable to unwanted reflection (step S14).

More specifically, for example, a threshold value function (Vth–Δt) obtained by subtracting the amount of signal intensity attenuation by the radio wave absorber 20 from the reference function (VR–Δt) is used as the reference, and signals of the threshold value or more are output as the detection signals of the object (step S14).

Meanwhile, signals below the threshold value (signals within the hatched area of FIG. 5) are excluded, as ghost or noise (unwanted reflection wave) from detection objects ("NO" in step S14).

Alternatively, the signal processor 35 may hold the threshold value function (Vth–Δt) to directly distinguish between an object to be detected and ghost or noise attributable to reflection from the threshold value function. The aforedescribed reference function or the threshold value function or a relational expression equivalent thereto may be held in the form of, for example, a mathematical expression or a table.

Although the pulse radar method has been described above as an example, the present invention can be applied to other radar methods such as the FMCW (Frequency Modulated Continuous Wave) method in the same manner.

For example, a carbon sheet or a resin containing a radio wave absorbing material such as carbon (carbon powder, carbon nanotube or carbon fiber, or the like) or ferrite can be used for the radio wave absorber 20. For example, a carbon sheet having a radio wave transmissivity of approximately 40% (i.e., an attenuation rate of 60%) can be used for the radio wave absorber 20. Alternatively, although polycarbonate (PC) has a transmissivity of approximately 20%, a carbon-containing PC having a transmissivity of approximately 20% (i.e., an attenuation rate of 80%) can be used for the radio wave absorber 20. Further, it is more preferable to use a carbon sheet or carbon-containing PC having a radio wave transmissivity of 10% or less (i.e., an attenuation rate of 90% or more) for the radio wave absorber 20.

If the light-transmissive cover 12 does not have a thickness optimized for the frequency of a radio wave, then a large reflection wave (e.g., approximately −5 dB) is generated. The radio wave reflected from the light-transmissive cover 12 returns toward the base body 11 as a reflection wave. In order to sufficiently absorb this, the radio wave absorber 20 preferably has an attenuation rate that is at least twice the reflection attenuation rate (radio wave reflectance) of the light-transmissive cover 12, which is the front cover. In this case, the radio wave reflected by the light-transmissive cover 12 is reflected by a vehicle component and the intensity of the reflection wave returning to the radar unit 15 is reduced to approximately 1/10 or less, so that sufficiently high noise identification accuracy is obtained.

The radio wave absorber 20 is not limited to those exemplified above, but can use various materials such as a dielectric radio wave absorbing material, a magnetic radio wave absorbing material, and a conductive radio wave absorbing material, or a combination of these materials.

Further, there are cases where reflection radar waves are sufficiently absorbed by the radio wave absorber 20 and an object to be detected can be detected with adequate accuracy, so that the processing of identification of unwanted signals by using the threshold value function (Vth–Δt) (step S14) is unnecessary.

According to the lamp device of the present embodiment, it is possible to effectively suppress ghost or noise that occurs when radar waves reflected by a component in the lamp device, such as the light-transmissive cover (front cover) 12, are reflected by a vehicle component, such as an engine, and the reflection waves return into the lamp device, resulting in unwanted reflection radar waves (and multiple-reflection waves thereof). Further, the base body 11 is placed on the surface of the radar unit 15 excluding the antenna surface 15S, and the radio wave absorber 20 is placed on the base body 11, thus making it possible to efficiently absorb unwanted reflection radar waves (and the multiple-reflection waves thereof) from a member placed on the front surface of the radar unit 15.

Thus, it is possible to provide a lamp device having high-precision radar functions such as low noise and wide dynamic range. In addition, it is easy to distinguish between signal and noise, making it possible to achieve high-speed and high-precision radar functions.

Further, especially a cross traffic radar used for cross traffic alert that detects an object obliquely in front of or obliquely behind a vehicle is adapted to detect an object at a relatively short distance, so that it is difficult to identify ghost or noise (unwanted reflection wave) attributable to the reflection from a vehicle component. According to the present invention, it is possible to distinguish with high accuracy between an object detection signal and an unwanted reflection wave especially when detecting an object at a relatively short distance.

Second Embodiment

Figure 7A:
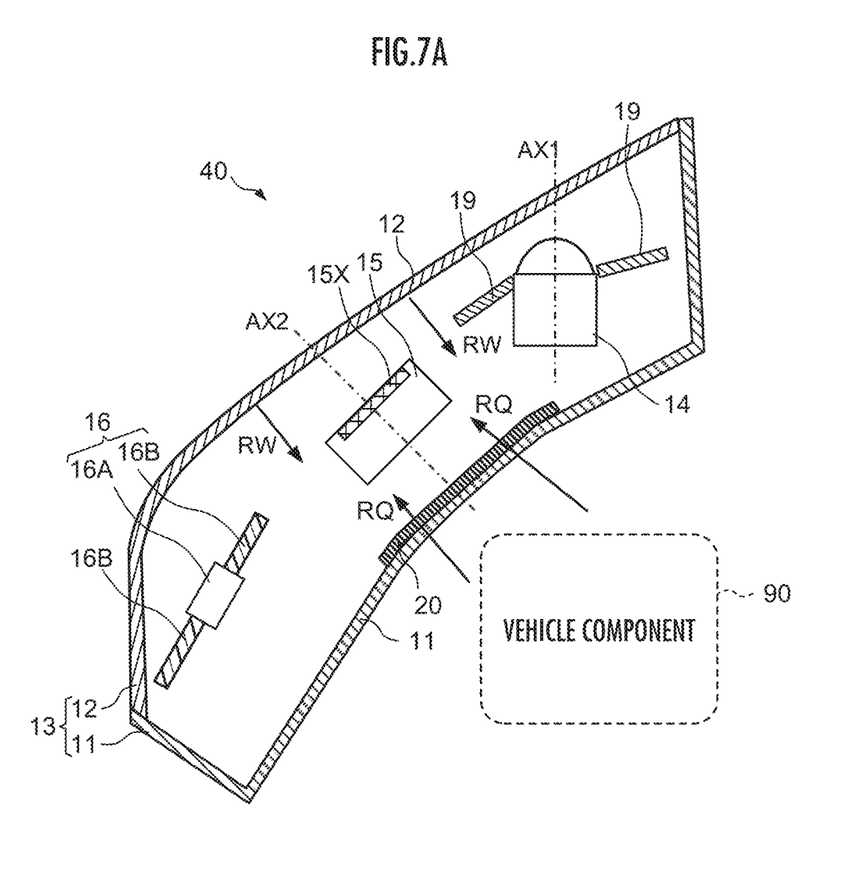
FIG. 7A is a diagram schematically illustrating an example of the internal structure of a lamp device 40 of a second embodiment of the present invention.
Figure 7B:
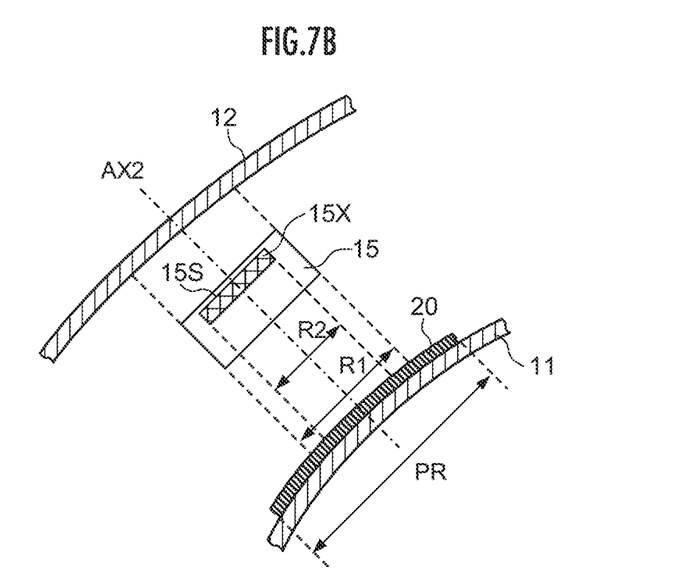
FIG. 7B is a diagram illustrating the placement and the size of a radio wave absorber 20 in the second embodiment of the present invention.

FIG. 7A is a diagram schematically illustrating an example of the internal structure of a lamp device 40 of a second embodiment of the present invention, and FIG. 7B is a diagram illustrating the placement and the size of a radio wave absorber 20.

In the present embodiment, the radio wave absorber 20 may be provided on a part of a base body 11. The radio wave absorber 20 (radio wave absorbing section) is provided between a radar unit 15 and a vehicle component 90 in such a manner as to be placed on a part of the base body 11, which partitions between the radar unit 15 and the vehicle component 90, when the radio wave absorber 20 is installed to a vehicle.

More specifically, the radio wave absorber 20 is provided to be positioned and sized such that reflection waves RQ, which result from radio waves reflected at least by a light-transmissive cover 12 and reflected by the vehicle component 90 and then directed into the lamp device 10, are attenuated.

In other words, the radio wave absorber 20 is provided on at least a part of the area on the surface of the base body 11 that opposes the light-transmissive cover (front cover) 12. This means that the radio wave absorber 20 is provided on the area of at least a part of the rear surface of the lamp device 40. The radio wave absorber 20 may be provided either inside or outside the lamp device 40.

FIG. 7B is a schematic partially enlarged view for describing the placement of the radio wave absorber 20. As illustrated in FIG. 7B, the radio wave absorber 20 (radio wave absorbing section) is preferably provided to have an area PR positioned and sized so as to be larger than an area R1 on the base body 11 obtained when the radar unit 15 is projected onto the base body 11 along a normal direction AX2 of the transmitting surface and/or the receiving surface (antenna surface 15S) of an antenna 15X of the radar unit 15, and to include the projection area R1.

Alternatively, at least the radio wave absorber 20 is preferably provided such that the radio wave absorber 20 is positioned and sized (the area PR of the radio wave absorber 20) to be larger than an area R2 on the base body 11 obtained when the antenna 15X is projected onto the base body 11 along the normal direction AX2, and to include the projection area R2.

The lamp device 40 of the second embodiment makes it possible to prevent reflection radar waves from a vehicle part, such as an engine, from entering the antenna 15X, causing noise, or affecting the transmission waves from the antenna 15X. It is also possible to prevent the reflection radar waves from a vehicle part that have entered the radar unit 15 from being multiple-reflected in the radar unit 15, thus interfering with the radar function of the radar unit 15.

The lamp device according to the present embodiment can effectively suppress ghost or noise attributable to reflection radar waves, which result from radar waves reflected by a light-transmissive cover or the like and further reflected by a vehicle component and returned into the lamp device, and the multiple-reflected waves thereof.

Thus, it is possible to provide a lamp device having high-precision radar functions such as low noise and wide dynamic range. In addition, it is easy to distinguish between signal and noise, making it possible to achieve high-speed and high-precision radar functions.

Third Embodiment

Figure 8:
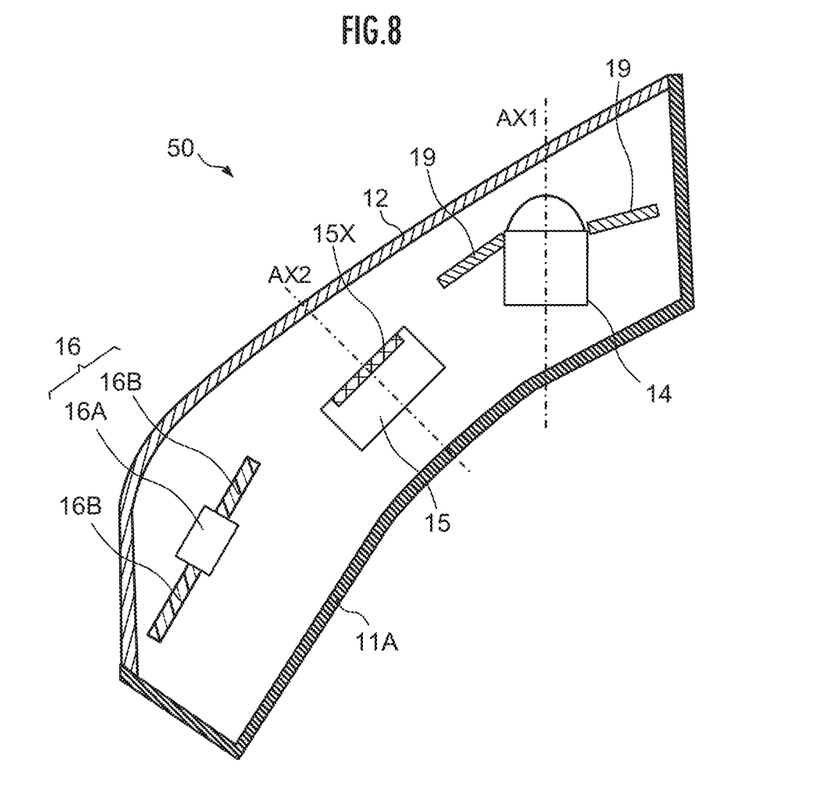
FIG. 8 is a diagram schematically illustrating an example of the internal structure of a lamp device 50 of a third embodiment of the present invention.

FIG. 8 is a diagram schematically illustrating an example of the internal structure of a lamp device 50 of a third embodiment of the present invention.

In the lamp device 50 of the present embodiment, instead of the base body 11 of the lamp device 10 of the first embodiment, a base body 11A is made of a radio wave absorbing material containing resin that contains a radio wave absorbing material such as carbon.

More specifically, the base body 11A is made of, for example, a carbon-containing resin in which carbon is contained in polycarbonate (PC). For example, a carbon-containing resin having a radar wave transmissivity of 40% or less is preferably used, and a carbon-containing resin having a transmissivity of 10% or less is more preferably used for the base body 11A.

The entire base body 11A does not necessarily have to be made of a radio wave absorbing material containing resin as long as a radio wave absorbing material is contained in the resin of the base body 11 and an area containing a radio wave absorbing material (radio wave absorbing section) is provided to have the area PR positioned and sized so as to include at least the area R1 on the base body 11 obtained when the radar unit 15 or the antenna 15X is projected onto the base body 11 in the normal direction AX2 of the antenna surface 15S as described above.

According to the lamp device 50 of the present embodiment, it is possible to form the radio wave absorbing section integrally with the base body 11 by a simple structure, and to provide a lamp device having radar functions that have the same advantages as those of the above-described embodiments.

Fourth Embodiment

Figure 9:
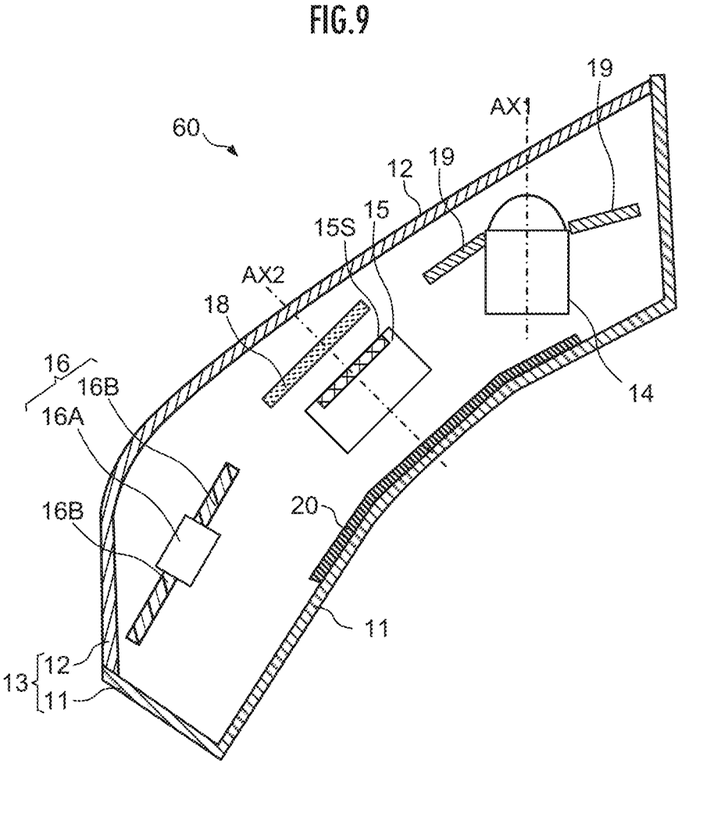
FIG. 9 is a diagram schematically illustrating an example of the internal structure of a lamp device 60 of a fourth embodiment of the present invention.

FIG. 9 is a diagram schematically illustrating an example of the internal structure of a lamp device 60 of a fourth embodiment of the present invention.

In the present embodiment, a shielding member (extension) 18 is provided in front of a radar unit 15 and between the radar unit 15 and a light-transmissive cover (front cover) 12.

The shielding member 18 is provided to cover the front surface of the radar unit so as to make the radar unit 15 less visible from the outside. The shielding member 18 is provided also to cover the entire surface of a transmitting/receiving surface (antenna surface) 15S of a transmitting/receiving antenna 15X of the radar unit 15.

Further, a radio wave absorber 20 (radio wave absorbing section) is provided to have an area PR positioned and sized so as to include an area R1 obtained when the radar unit 15 is projected onto a base body 11 in a normal direction AX2 of the antenna surface 15S of the radar unit 15 (refer to FIG. 7B).

Thus, it is possible to effectively suppress ghost or noise that occurs when reflection waves reflected by the shielding member 18 are reflected by a vehicle component and the reflection waves return into the lamp device. Further, the fourth embodiment has the same advantages as those of the above-described embodiments. Therefore, it is possible to provide a lamp device having high-speed and high-precision radar functions such as low noise and wide dynamic range.

DESCRIPTION OF REFERENCE NUMERALS 10, 40, 50, 60: lamp device
11: base body
12: light-transmissive cover
14: lamp unit
15: radar unit
15S: antenna surface
15X: transmitting/receiving antenna
16: light emitting unit
16A: light source
16B: light guide
18: shielding member
19: extension
20: radio wave absorbing portion
30: millimeter wave sensor module
31: generator
35: signal processor
35A: distance/signal intensity calculating unit
35B: signal identification unit

The invention claimed is:
1. A lamp device comprising:
a housing, which is a part to be attached to a vehicle;
a lamp;
a radar having an antenna which transmits a radar wave as a transmission wave and receives a reflection wave from an object of the transmission wave;
a light-transmissive cover which is attached to cover a front surface of the housing so as to accommodate therein the lamp and the radar, and through which the radar wave passes;

a radio wave absorption section provided on a surface of the housing that faces the light-transmissive cover or on a surface on the opposite side therefrom; and a signal processor connected to the radar, wherein the signal processor is configured to:

calculate a relationship between a time difference between the transmission wave and the reflection wave and a signal intensity of the reflection wave, calculate a relationship between a time difference between an unwanted reflection wave, which is the transmission wave attenuated by the radio wave absorption section having a predetermined radio wave absorption ratio before reaching the antenna, and the transmission wave, and a signal intensity of the unwanted reflection wave, and calculate a distance from the object to the radar by processing a signal based on the reflection wave and the unwanted reflection wave received at the antenna by the signal processor.

2. The lamp device according to claim 1, wherein the radio wave absorption section is provided in an area that includes at least an area on the housing obtained by projecting the radar along a normal direction of a transmitting surface or a receiving surface of the antenna.

3. The lamp device according to claim 1, wherein the radio wave absorption section is provided in an area that includes an area on the housing obtained by projecting the antenna along a normal direction of a transmitting surface or a receiving surface of at least the antenna.

4. A lamp device comprising:

a housing, which is a part to be attached to a vehicle;

a lamp;

a radar having an antenna which transmits a radar wave and receives a reflection wave from an object;

a light-transmissive cover which is attached to cover a front surface of the housing so as to accommodate therein the lamp and the radar, and through which the radar wave passes; and a signal processor connected to the radar, wherein the signal processor is configured to:

calculate a relationship between a time difference between the transmission wave and the reflection wave and a signal intensity of the reflection wave, calculate a relationship between a time difference between an unwanted reflection wave, which is the transmission wave attenuated by the radio wave absorption section having a predetermined radio wave absorption ratio before reaching the antenna, and the transmission wave, and a signal intensity of the unwanted reflection wave, and calculate a distance from the object to the radar by processing a signal based on the reflection wave and the unwanted reflection wave received at the antenna by the signal processor, and wherein the housing includes a radio wave absorption material which absorbs the radar wave.

5. The lamp device according to claim 4, wherein, in the housing, a radio wave absorption material containing area, which contains the radio wave absorption material, is provided in an area including at least an area on the housing obtained by projecting the radar along a normal direction of a transmitting surface or a receiving surface of the antenna.

6. The lamp device according to claim 4, wherein, in the housing, a radio wave absorption material containing area, which contains the radio wave absorption material, is provided in an area including an area on the housing obtained by projecting the antenna along a normal direction of a transmitting surface or a receiving surface of at least the antenna.

7. The lamp device according to claim 1, wherein a normal direction of the antenna surface of the radar is set inclined outward with respect to a traveling direction of the vehicle.

8. The lamp device according to claim 7, wherein the light-transmissive cover is formed of polycarbonate (PC) resin or acrylic (PMMA) resin.

9. The lamp device according to claim 7, wherein the radio wave absorption section uses a radio wave absorber composed of a carbon sheet or a resin containing radio wave absorbing material.

10. The lamp device according to claim 7, wherein a shield that makes the radar less visible from outside is provided in front of the radar.

11. The lamp device according to claim 4, wherein a normal direction of the antenna surface of the radar is set inclined outward with respect to a traveling direction of the vehicle.

12. The lamp device according to claim 11, wherein the light-transmissive cover is formed of polycarbonate (PC) resin or acrylic (PMMA) resin.

13. The lamp device according to claim 11, wherein the radio wave absorption material uses at least one of carbon powder, carbon nanotube, carbon fiber, and ferrite.

14. The lamp device according to claim 11, wherein a shield that makes the radar less visible from outside is provided in front of the radar.

* * * * *